(12) United States Patent
Seenivasan

(10) Patent No.: US 7,544,271 B1
(45) Date of Patent: Jun. 9, 2009

(54) OPEN FLOTATION DE-INKING MODULE FOR RECYCLED PAPER

(76) Inventor: Narayanasamy Seenivasan, 3828 Cochran Dr., Carrollton, TX (US) 75010

( * ) Notice: Subject to any disclaimer, the term of this patent is extended or adjusted under 35 U.S.C. 154(b) by 433 days.

(21) Appl. No.: 11/451,174

(22) Filed: Jun. 12, 2006

(51) Int. Cl.
*D21B 1/08* (2006.01)
(52) U.S. Cl. .............................. 162/4; 162/360; 162/5; 162/6; 162/7; 209/170; 210/221.2
(58) Field of Classification Search .................. 162/4, 162/5, 6, 7, 8, 55, 360; 209/170; 210/221.2
See application file for complete search history.

(56) References Cited

U.S. PATENT DOCUMENTS

| | | |
|---|---|---|
| 1,279,040 A | 9/1918 | Thomas |
| 2,793,185 A | 5/1957 | Alberktsson et al. |
| 3,043,433 A | 7/1962 | Singer |
| 3,098,784 A | 7/1963 | Gorman, Jr. |
| 3,354,028 A | 11/1967 | Illingworth et al. |
| 4,110,210 A | 8/1978 | Degner et al. |
| 4,157,952 A | 6/1979 | Krofta |
| 4,328,095 A | 5/1982 | Ortner et al. |
| 4,331,534 A | 5/1982 | Barnscheidt |
| 4,477,341 A | 10/1984 | Schweiss et al. |
| 4,512,888 A * | 4/1985 | Flynn ...................... 210/221.2 |
| 4,560,474 A | 12/1985 | Holik |
| 4,639,313 A | 1/1987 | Zipperian |
| 4,726,897 A | 2/1988 | Schweiss et al. |
| 4,737,272 A | 4/1988 | Szatkowski et al. |
| 4,842,777 A | 6/1989 | Lamort |
| 5,242,585 A | 9/1993 | Krofta |
| 5,273,624 A | 12/1993 | Chamberlain et al. |
| 5,310,459 A | 5/1994 | Krofta |
| 5,437,784 A | 8/1995 | Meinecke et al. |
| 5,465,848 A | 11/1995 | Veh et al. |
| 5,529,190 A | 6/1996 | Carlton et al. |
| 5,624,609 A | 4/1997 | Serres et al. |
| 5,762,781 A | 6/1998 | Bodnaras |
| 6,082,549 A | 7/2000 | Gommel et al. |
| 6,197,153 B1 | 3/2001 | Serres |
| 6,585,854 B2 | 7/2003 | Scherzinger et al. |
| 6,881,297 B2 | 4/2005 | Scherzinger et al. |
| 6,959,815 B2 | 11/2005 | Xu et al. |
| 2004/0232053 A1 * | 11/2004 | Serres et al. ................. 209/170 |

FOREIGN PATENT DOCUMENTS

| | | |
|---|---|---|
| GB | 2.017.780 | 10/1979 |
| GB | 2.130.920 | 6/1984 |
| GB | 2.144.729 | 3/1985 |
| WO | WO8803838 | 6/1988 |

* cited by examiner

*Primary Examiner*—Mark Halpern
(74) *Attorney, Agent, or Firm*—Michael I Kroll

(57) ABSTRACT

Disclosed is an open flotation de-inking module for recycled paper comprised of a flotation cell having an injector module and air control module used in conjunction to infuse micro air bubbles into pulp slurry to optimize the process of separating ink, clay, stickies and other float able contaminants from the recycled pulp slurry by negatively pressurizing the slurry as it accelerates through the injector drawing air from the air control module saturating the slurry with air bubbles before injection into the flotation cell whereupon the contaminants will adhere to the bubbles as they move to the surface forming a foam that is passively skimmed into reject compartments with the decontaminated pulp channeled from the floatation cell for further processing.

10 Claims, 9 Drawing Sheets

OPEN FLOTATION DE-INKING MODULE FOR RECYCLED PAPER

BACKGROUND OF THE INVENTION

1. Field of the Invention

The present invention relates generally to a de-inking module, more specifically, to an open flotation conventional de-inking module adopted in the recycled paper processing plants, in which, ink separation and removal constitutes a major task. The specific concerns of this invention are the concept and the equipment for the separation and removal of the ink, stickies and ash from the pulp slurry contaminated with ink, clay and stickies.

Waste paper, usually called by the public, is actually not a waste and a very valuable source of fiber for recycled paper mills. Recovery of fiber has been increasing due to the solid waste problem and the demand by industry as well. There are several kinds of recovered paper, such as old corrugated container, old news print, white grades with several sub categories. The old corrugated container is usually recycled with out any ink removal to produce brown grade paper and boards.

A majority of the old newsprint and other white grade paper are recycled into various valuable paper categories using the de-inking process. There are two types of de-inking called: washing and flotation. Flotation usually has a washing step in the subsequent steps and can be called a combination process. The washing de-inking without any ink purging using some kind of white water clarification is not true de-inking as the ink recycles in the system. It is less common to have washing as the sole de-inking process at present. The washing process does not help in handling large ink and other dirt particles whereas the flotation process separates and removes a wide range of particles including small particles.

Several types of chemistries are used in the de-inking process like hardness dependent calcium soap froth, hardness independent surfactant, enzymatic and so forth. All these chemistries help release the ink from the fiber and attach the ink particles to the air bubbles in a selective adsorption process. The process needs equipment to mechanically separate and remove the ink off the pulp suspension. This is commonly called a flotation cell in the de-inking mills.

A de-inking mill usually has re-pulping equipment called a pulper at the beginning of the process to repulp the recovered paper brought into the mill for recycling. The re-pulping is done with water and chemicals to aid the pulping and sometimes bleaching at the same time. De-inking agent is usually added in the pulper and gets well dispersed with the pulp. The ink release from the fiber is aided by the de-inking agent with the wetting of the fiber surface as well as swelling. The same surfactant helps in the froth flotation in the primary de-inking system for the formation of the foam and selective adsorption of the ink particles onto the air bubbles.

For the effective separation of the ink from the pulp suspension, the air bubbles should be formed mechanically inside the pulp suspension which raise to the surface on which the ink particles adsorb to float to the surface.

A flotation cell is very important in bringing air and dispersing the air to increase the collision frequency with the ink particles along with other unwanted hydrophobic materials. The higher the bubble-ink collision frequency the better the chances of ink attachment to the foam. Attaching as much ink as possible under given operating conditions flotation cells remove the foam using several techniques like overflow, scraping using paddles, pressure under enclosed vessel and so forth. Thus de-inking is accomplished in various ways within froth flotation technology.

The present invention is an open flotation de-inking module for recycled paper comprised of a flotation cell having an injector module and air control module used in conjunction to infuse micro air bubbles into pulp slurry to optimize the process of separating ink, clay, stickies and other floatable contaminants from the recycled pulp slurry.

Accordingly, the slurry is negatively pressurized as it accelerates through the injector drawing air from the air control module saturating the slurry with air bubbles before injection into the flotation cell whereupon the contaminants will adhere to the bubbles as they move to the surface forming a foam that is passively skimmed into reject compartments with the decontaminated pulp channeled from the floatation cell for further processing.

The flotation cell forms means for the air infused slurry to effervesce forming a foam having the contaminants therein, which are passively skimmed into an effluent line. The flotation cell is a cylindrical receptacle having a centrally disposed cylindrical reject line with a flared opening. Tangently extending from the flared reject line opening to the receptacle exterior wall is a planar skimmer plate diverting the foam into the reject line. The air infused slurry is tangently injected into the flotation cell creating a rotational current with a decontaminated slurry accept line also tangently extending from the flotation cell.

The present invention provides for variations of the placement of the feed and accept conduits and various shapes for the passive skimmer plate.

2. Description of the Prior Art

There are other de-inking apparatus. Typical of these is U.S. Pat. No. 2,793,185 issued to Albrektsson, et al on May 21, 1957.

Another patent was issued to Singer on Jul. 10, 1962 as U.S. Pat. No. 3,043,433. Yet another U.S. Pat. No. 4,157,952 was issued to Krofta on Jun. 12, 1979. Another patent was issued to Ortnet, et al. as U.S. Pat. No. 4,328,095 on May 4, 1982 and still yet another was issued on Jan. 27, 1987 to Zipperian as U.S. Pat. No. 4,639,313.

Another patent was issued to Szatkowski; et al. on Apr. 12, 1988 as U.S. Pat. No. 4,737,272. Yet another U.S. Pat. No. 5,273,624 was issued to Chamberlain, et al. on Dec. 28, 1993. Another was issued to Carlton, et al. on Jun. 25, 1996 as U.S. Pat. No. 5,529,190.

Another patent was issued to Bodnaras on Jun. 9, 1998 as U.S. Pat. No. 5,762,781. Yet another U.S. Pat. No. 6,082,549 was issued to Gommel, et al. on Jul. 4, 2000. Another was issued to Scherzinger, et al. on Jul. 1, 2003 as U.S. Pat. No. 6,585,854. Still another was issued to Xu, et al on Nov. 1, 2005 as U.S. Pat. No. 6,959,815 and another was issued as U.K. Patent No. GB2144729 to Lecoffre, et al. on Mar. 13, 1985.

U.S. Pat. No. 2,793,185

Inventor: John Oscar Georg Albrektsson, et al.

Issued: May 21, 1957

According to the invention the air or other gas required for the flotation is first under overpressure substantially dissolved in a quantity of liquid that is small in relation to the quantity of water to be treated by flotation and then the air dispersion formed by sudden reduction of the pressure on the liquid is introduced into the water to be purified. Thus, in the present invention, preferably pure water in a quantity that is small in relation to the water to be purified by flotation is caused in a receptacle to take up air under pressure. When this water flows out from the receptacle and the pressure is rapidly reduced, the dissolved air will separate as extremely small air bubbles forming with the water a dispersion with very great stability. This dispersion is mixed with the water to be purified at or before the entrance of the latter into the flotation tank. The quantity of the air of the dispersion is in proportion to the pressure used and the saturation degree of the water, and in accordance therewith the air dispersion has a more or less milky color. In the present invention there are no difficulties in controlling the quantity and distribution of the air in the water to be treated according to requirements and desire.

U.S. Pat. No. 3,043,433

Inventor: Oscar C. Singer

Issued: Jul. 10, 1962

This invention relates to a bio-oxidation sewage treating plant. An object is to produce a bio-oxidation sewage treating plant which constitutes a unitary installation requiring a minimum of space, but which is equipped through a new and improved arrangement of parts, with all the necessary or desirable elements for effecting efficient sewage treatment. Other objects and advantages of the invention will here in after appear, and, for purposes of illustration but not of limitation, an embodiment of the invention is shown in the accompanying drawings in which FIG. 1 is a vertical sectional elevation of a bio-oxidation sewage treating plant embodying the invention; and FIG. 2 is a top plan view of the structure shown on FIG. 1.

U.S. Pat. No. 4,157,952

Inventor: Milos Krofta

Issued: Jun. 12, 1979

Apparatus for de-inking waste paper pulp using a foam flotation process in which the deinked slurry is to be recycled for the production of paper. The old paper is pulped (slushed), mixed with water and flotation- and other chemicals, to produce a slurry which is introduced into the flotation tank. Movement of the slurry through the flotation tank is achieved by the positioning of one or more water injector nozzles with air inlets which causes a swirling rotation from the injector towards a central outlet. Froth or foam bubbles float to the surface of the slurry carrying ink particles. A baffle plate leads the floated froth or foam and ink particles to a vacuum actuated outlet.

U.S. Pat. No. 4,328,095

Inventor: Herbert Ortner, et al.

Issued: May 4, 1982

Apparatus is provided for reprocessing old paper in a series of flotation cells arranged one behind another, the suspension discharge 11 from the front cell being connected to the suspension inlet 8 of the following cell, each cell being provided with a stirring impeller 3, an air infeed device 9 and a foam outlet opening 12. The cells are provided by a substantially tubular body 1 which is horizontal or slopes gradually downward towards the rear, the tubular body being divided into a plurality of sections by partition walls 2 extending substantially vertically. Each section is provided with a suspension inlet 8, a suspension discharge outlet 11, a foam outlet opening 12, a stirring impeller 3, and an air infeed device 9.

U.S. Pat. No. 4,639,313

Inventor: Donald E. Zipperian

Issued: Jan. 27, 1987

The invention relates to the concentration and beneficiation of particulate matter by froth flotation and in particular to improvements in hydraulic-pneumatic flotation apparatus which contribute to the efficiency of operation. Such apparatus employs a constriction plate which separates vertically arranged flotation and hydraulic compartments. A discharge duct may be used to extend through the hydraulic compartment and to open through the constriction plate centrally thereof. Orifices in both the constriction plate are in communication with the hydraulic compartment to provide a uniform dispersion of air bubbles in the flotation compartment. Aerated water distribution manifolds within the hydraulic compartment and within the lower portion of the flotation compartment are provided to enter the aerated water into the flotation compartment substantially uniformly throughout a horizontal cross-section thereof. In order to minimize the energy consumption of the apparatus and to provide for the introduction of aerated water at a reduced flow rate, amenable to the separation of aqueous pulps having a low concentration of solid matter by volume, such as sulfides, a stream of pressurized air is passed through an eductor wherein a mixture of water and, if desired, an appropriate surfactant is aspirated into the stream of flowing pressurized air. The flowing stream of pressurized air and the aspirated water and surfactant are then passed through a venturi region, producing a highly aerated, low water volume stream of aerated water for delivery to the hydraulic compartment.

U.S. Pat. No. 4,737,272

Inventor: Marian Szatkowski, et al.

Issued: Apr. 12, 1988

A method for improving separation of the floatable phase from the non-floatable phase of a slurry of particulate material in a froth flotation machine comprising a tank, an upper outlet port for discharge of the floatable phase, and a mechanism for delivering air to the slurry in the tank to form a froth which includes a mixture of air bubbles and the floatable phase from the slurry, with the rate and selectivity of separation of the floatable phase from the slurry for predetermined size particles of the floatable phase and at a predetermined concentration of the floatable phase being dependent on the total volume and size distribution of the air bubbles generated in the slurry, the method of this invention comprising the steps of providing a quantity of slurry in the tank, generating air bubbles of relatively small size and relatively large size, and controlling the volume of air as small bubbles and the volume of air as large bubbles in response to the concentration of the floatable phase of the slurry for enhanced separation of the floatable phase from the slurry. A method for improved froth flotation separation of the phases of a multi-phase liquid, and improved single-cell and multiple cell froth flotation machines operating in accordance with the methods of this invention are also disclosed.

U.S. Pat. No. 5,273,624

Inventor: Jeffrey L. Chamberlain, et al.

Issued: Dec. 28, 1993

A method and several embodiments of apparatus are disclosed for use in foam flotation separation. The method discloses performing the separation in a module operated at non-atmospheric pressure, and the apparatus disclosed are suitable for use as the module of the method. Both the method and the apparatus contemplate positive and negative pressure operation.

U.S. Pat. No. 5,529,190

Inventor: Keith A. Carlton, et al.

Issued: Jun. 25, 1996

A slurry of recycled cellulose fibers is deinked by introducing the slurry into the first end of a vortex, sparging gas radially inwardly into the slurry to cause gas bubbles to attach to contaminants and ink particles to form an aerated slurry, discharging the aerated slurry from near the second end of the vortex into a separation vessel, effecting separation of a foam of ink laden gas bubbles from the cellulose fiber slurry in the separation vessel, and removing from the separation vessel the foam with associated ink and contaminants in a first stream, and de-inked cellulose fiber slurry in a second stream. The separation vessel is typically a foam separating vessel with separation effected by flotation, and by discharging the foam. The slurry is introduced into the flotation vessel below the liquid level in it. The slurry typically has a consistency of about 0.5-2%, and the gas to slurry volume ratio during sparging may be 0.1-1 to 1.0 (e.g. 0.2-0.7 to 1, or 0.3-0.4 to 1). The foam separating vessel may be cylindrical with a shower head at the top, and rejects therefrom directed to a rejects tank. Sparging takes place in a hydrocyclone with an outlet that may or may not be restricted; a rejects outlet may extend from a first end of the hydrocyclone to a rejects tank.

U.S. Pat. No. 5,762,781

Inventor: George Bodnaras

Issued: Jun. 9, 1998

A flotation apparatus including: an elongate vertical riser (142) in which a co-current flow of gas/slurry liquid mixture rises upwards to a discharge mouth at its top end; an aeration unit (140) provided at a lower end of the riser; a separation unit (150) provided at the top end of the riser; and wherein the height of the riser is selected to produce substantially turbulence free flow in which a high gas lift occurs in the riser such that a pressure drop between the liquid inlet and the discharge outlet of the aeration unit is sufficient to produce gas particle dispersion and recirculation of the slurry liquid through the flotation apparatus.

U.S. Pat. No. 6,082,549

Inventor: Axel Gommel, et al.

Issued: Jul. 4, 2000

A process and apparatus serves to remove solid matter from an aqueous material suspension produced from printed used paper. As many interfering material particles are collected by floatation as possible in a floatation foam and diverted as a reject. A perforated separating element is located above the fibrous material suspension. Between the separating element and the floatation foam, an intermediate layer is formed. In the intermediate layer the fibers, which have been entrained by gas bubbles are again rinsed and retrieved.

U.S. Pat. No. 6,585,854

Inventor: Bernhard Scherzinger, et al.

Issued: Jul. 1, 2003

A device and process for aerating dispersions, particularly for flotation of pulp suspensions, in a de-inking process where the pulp suspension containing dirt particles is sprayed into a tank together with air. The air is injected at a minimum of two successive points and mixed with the suspension.

U.S. Pat. No. 6,959,815

Inventor: Zhenghe Xu, et al.

Issued: Nov. 1, 2005

The present invention provides for a reactive oily bubble carrier comprising: (a) a gas bubble having an oil-coating; and (b) a collector dissolved within the oil-coating. The present invention also provides for the use a reactive oily bubble carrier in a flotation target particle separation process. The present invention also provides for a flotation target particle separation process using the reactive oily bubble carriers disclosed herein.

U.K. Patent Number GB2144729

Inventor: Yves Lecoffre, et al.

Issued: Mar. 13, 1985

In a microbubble injector usable to separate materials of different density by flotation, a deflector wall deflects radially a flow of water exiting under pressure from an injector hole and containing dissolved air at the saturation concentration. This procures cavitation which is localized at the edges of the hole and which generates the required microbubbles of air downflow thereof.

While these injector assemblies may be suitable for the purposes for which they were designed, they would not be as suitable for the purposes of the present invention, as hereinafter described.

SUMMARY OF THE PRESENT INVENTION

A primary object of the present invention is to provide a compact and efficient flotation cell for ink removal from the pulp slurry by means of internal vacuum created by the injector system.

Another object of the present invention is to provide a flotation cell for ink removal from the pulp slurry that minimizes the floor space for the de-inking equipment.

Yet another object of the present invention is to provide a flotation cell system that results in brighter pulp in one or two steps.

Still yet another object of the present invention is to provide a flotation cell system that minimizes the energy consumption similar to the several other conventional cells.

Another object of the present invention is to provide a flotation cell system that minimizes the fiber loss and maximizes ink and ash removal efficiency.

Yet another object of the present invention is to provide a flotation cell system that eliminates the use of defoamer chemicals to handle the foam.

Another object of the present invention is to provide a flotation cell system that eliminates the need for showers for the foam and reduces the reject flow off the cells to the effluent treatment.

Additional objects of the present invention will appear as the description proceeds.

The present invention overcomes the shortcomings of the prior art by providing equipment that is used to separate ink, clay, stickies and other floatable contaminants from recycled pulp slurry. The contaminated pulp slurry is injected into the flotation cell and the foam generated is skimmed off by a stationary skimmer plate into a reject line. The reject is drained into the effluent stream and the accept from the flotation cell is sent to the downstream process.

The foregoing and other objects and advantages will appear from the description to follow. In the description reference is made to the accompanying drawing, which forms a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawing, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWING FIGURES

In order that the invention may be more fully understood, it will now be described, by way of example, with reference to the accompanying drawing in which.

DESCRIPTION OF THE REFERENCED NUMERALS

Figure 1:
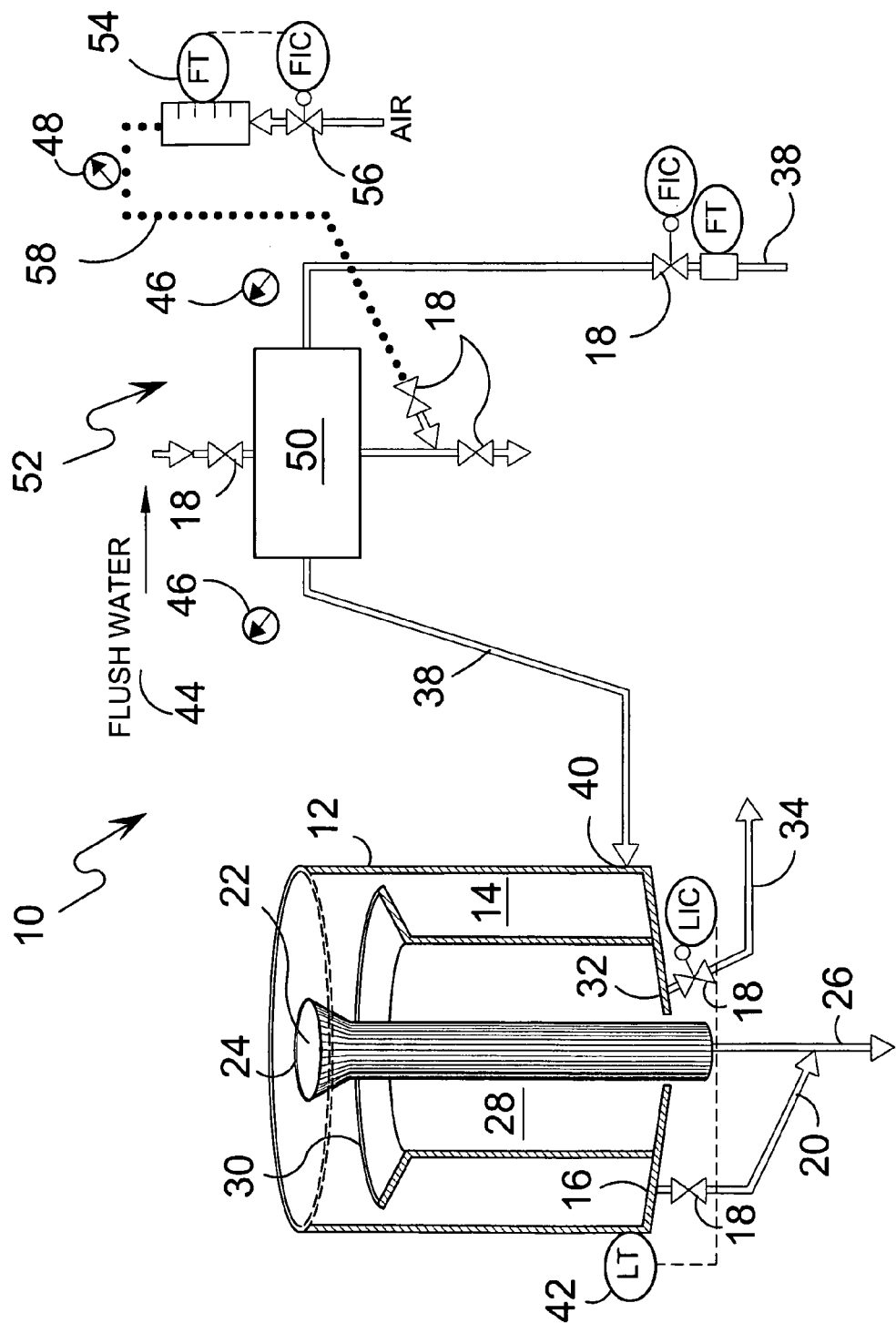
FIG. 1 is an illustrative view of the open flotation de-inking module for recycled paper.

Turning now descriptively to the drawings, in which similar reference characters denote similar elements throughout the several views, the Figures illustrate the Open Flotation De-inking Module for Recycled Paper of the present invention. With regard to the reference numerals used, the following numbering is used throughout the various drawing figures.

10 Open Flotation De-inking Module for Recycled Paper
12 flotation tank
14 slurry compartment
16 drain port
18 valve
20 drain line
22 reject compartment
24 reject inlet port
26 reject line
28 accept compartment
30 accept inlet port
32 accept outlet port
34 accept line
36 foam skimmer plate
38 feed line
40 feed line tank port
42 level transmitter
44 flush water
46 pressure gauge
48 vacuum gauge
50 injector
52 air-flow control
54 flow meter
56 make-up air valve
58 air supply line
60 nozzle
62 ingress nozzle
64 egress nozzle
66 nozzle air intake
68 nozzle plate
70 injector air intake

DETAILED DESCRIPTION OF THE PREFERRED EMBODIMENT

The following discussion describes in detail one embodiment of the invention (and several variations of that embodiment). This discussion should not be construed, however, as limiting the invention to those particular embodiments, practitioners skilled in the art will recognize numerous other embodiments as well. For definition of the complete scope of the invention, the reader is directed to appended claims.

Referring to FIG. 1, shown is an illustrative view of the open flotation de-inking module for recycled paper. The open flotation de-inking module for recycled paper 10 is comprised of a flotation cell 12 having an injector module 50 and air control module 52 used in conjunction to infuse micro air bubbles into pulp slurry to optimize the process of separating ink, clay, stickies and other float able contaminants from the recycled pulp slurry. Accordingly, the slurry is negatively pressurized as it accelerates through the injector 50 drawing air from the air control module 52 saturating the slurry with air bubbles before injection into the flotation cell 12 whereupon the contaminants will adhere to the bubbles as they move to the surface forming a foam that is passively skimmed into reject compartment 22 with the decontaminated pulp channeled from the floatation cell 12 for further processing.

Figure 2:
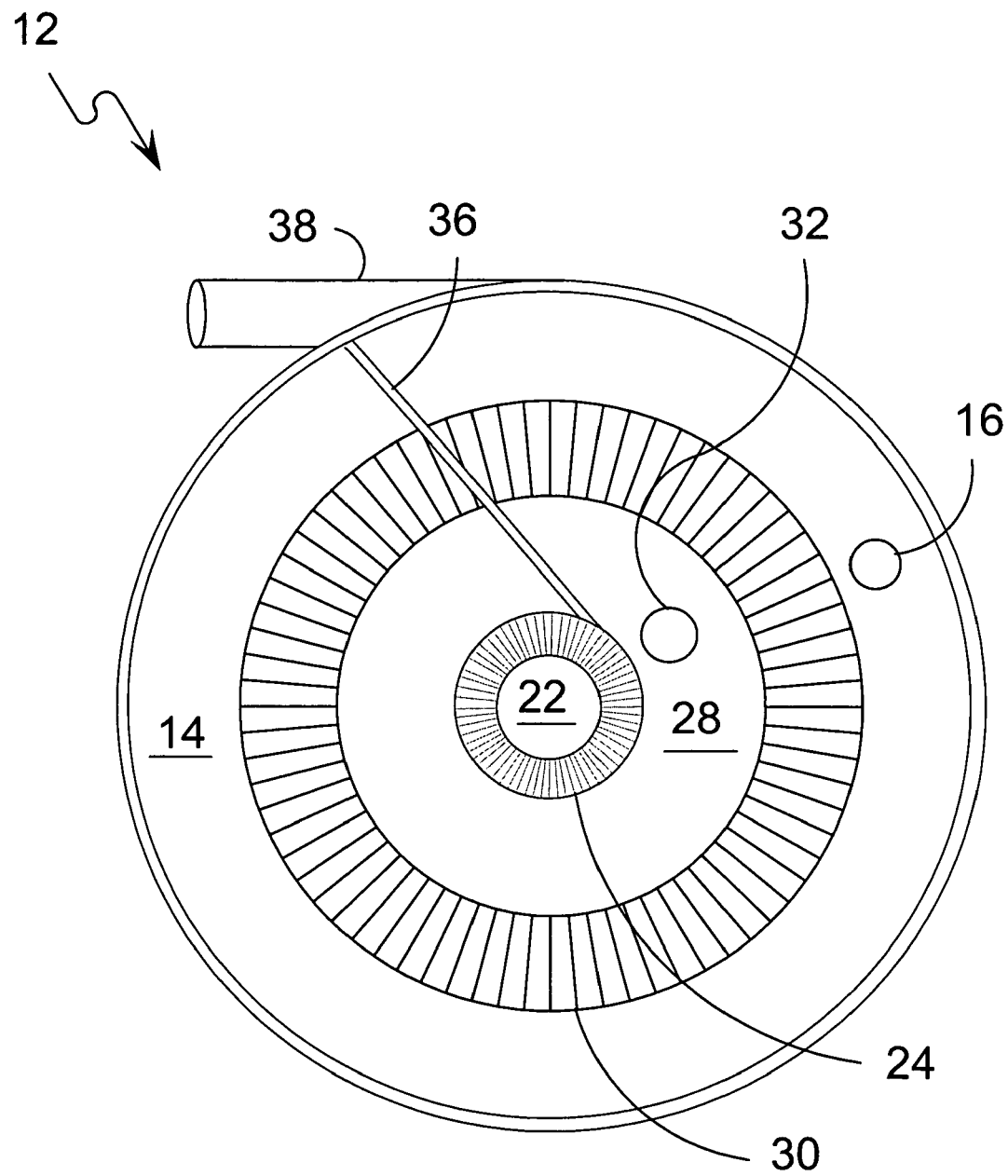
FIG. 2 is a top view of the flotation cell of the open de-inking module for recycled paper.

Referring to FIG. 2, illustrated is a top view of the flotation cell of the open de-inking module for recycled paper. The flotation cell 12 forms means for the air infused slurry to effervesce forming a foam having the contaminants therein, which are passively skimmed into an effluent line. As illustrated the flotation cell 12 is a cylindrical receptacle having a centrally disposed cylindrical reject compartment 22 with a flared opening 24 and egress line 26. Tangently extending from the flared reject opening 24 to the receptacle exterior wall 12 is a planar skimmer plate 36 diverting the foam into the reject line. The air infused slurry is tangently injected via feed line 38 through port 40 into the flotation cell slurry compartment 14 creating a rotational current with a decontaminated slurry accept compartment 28 having egress port 32 leading into accept line 34 for further processing. Also shown is drain port 16 and drain line 20.

Figure 3:
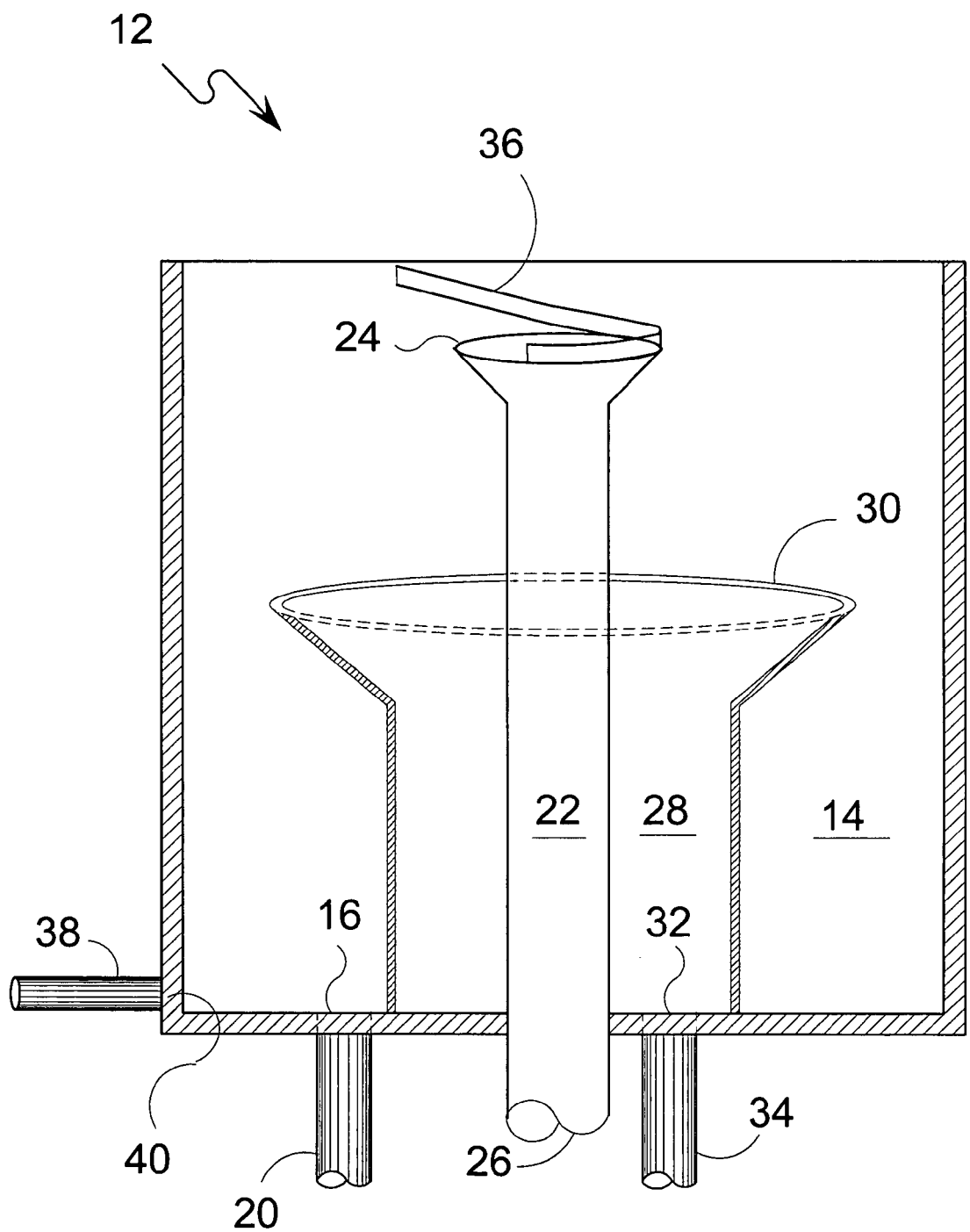
FIG. 3 is a front view of the flotation, cell of the open de-inking module for recycled paper.

Referring to FIG. 3, depicted is a front view of the flotation cell of the open de-inking module for recycled paper. Shown is a front view of the flotation cell 12 having a centrally disposed foam reject line 22,26 with the skimmer plate 36 extending to the exterior wall. Also shown is the injection feed line 38 and the decontaminated slurry accept line 34 positioned approximate the flotation cell base. The present invention provides for variations of the placement of the feed and accept conduits and various shapes for the passive skimmer plate.

Figure 4:
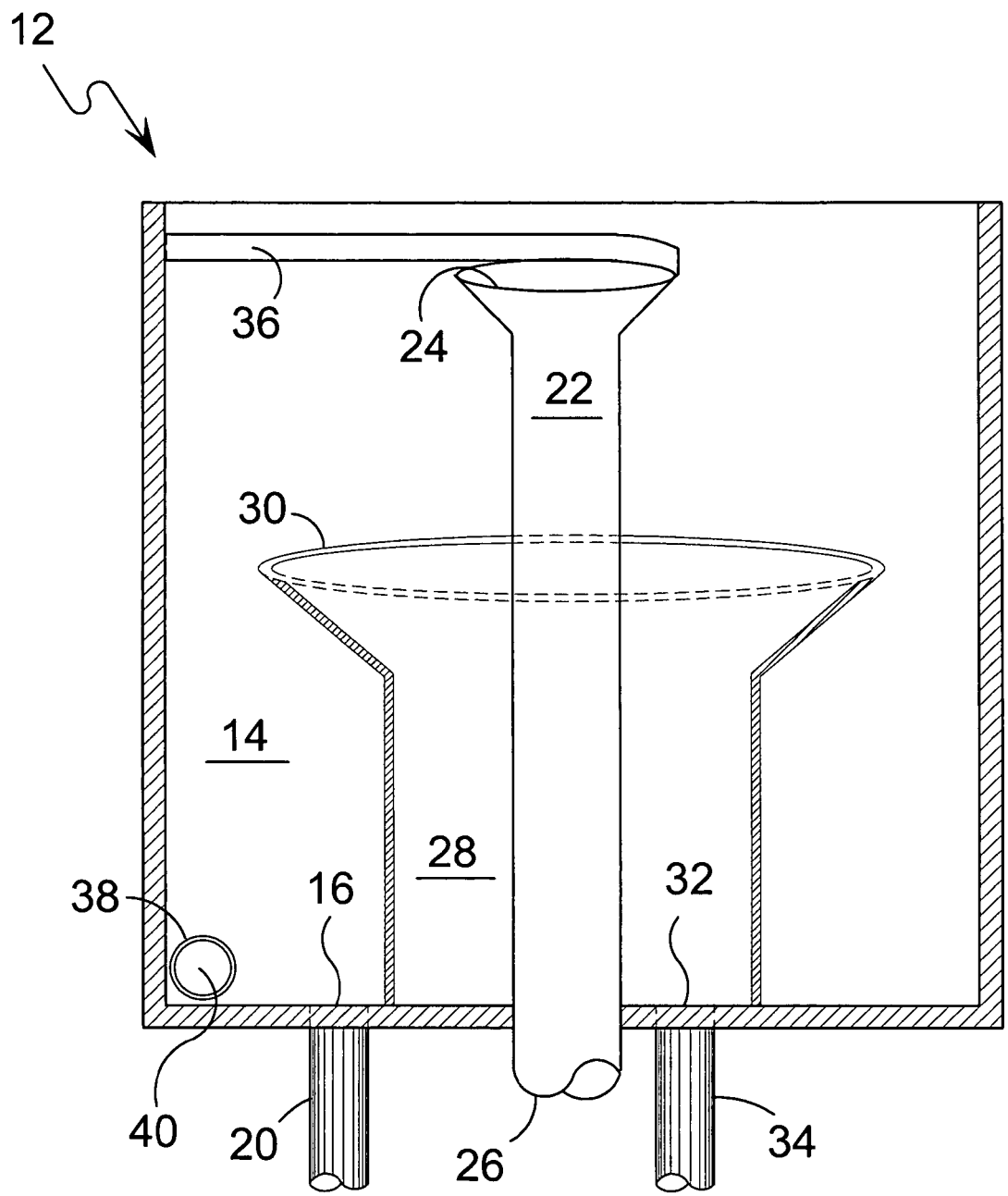
FIG. 4 is a left side planar view of the floatation cell of the open de-inking module for recycled paper.

Referring to FIG. 4, drawn is a left side planar view of the floatation cell of the open de-inking module for recycled paper. Shown is a left side view of the open flotation cell 12 of the de-inking module for recycled paper 10. The flotation cell 12 forms means for the air infused slurry to effervesce forming a foam having the contaminants therein, which are passively skimmed into an effluent line. As illustrated the flotation cell 12 is a cylindrical receptacle having a centrally disposed cylindrical reject compartment 22 with a flared opening 24 and egress line 26. Tangently extending from the flared reject opening 24 to the receptacle exterior wall 12 is a planar skimmer plate 36 diverting the foam into the reject line. The air infused slurry is tangently injected via feed line 38 through port 40 into the flotation cell slurry compartment 14 creating a rotational current with a decontaminated slurry accept compartment 28 having egress port 32 leading into accept line 34 for further processing. Also shown is drain port 16 and drain line 20. The present invention provides for variations of the placement of the feed and accept conduits and various shapes for the passive skimmer plate.

Figure 5:
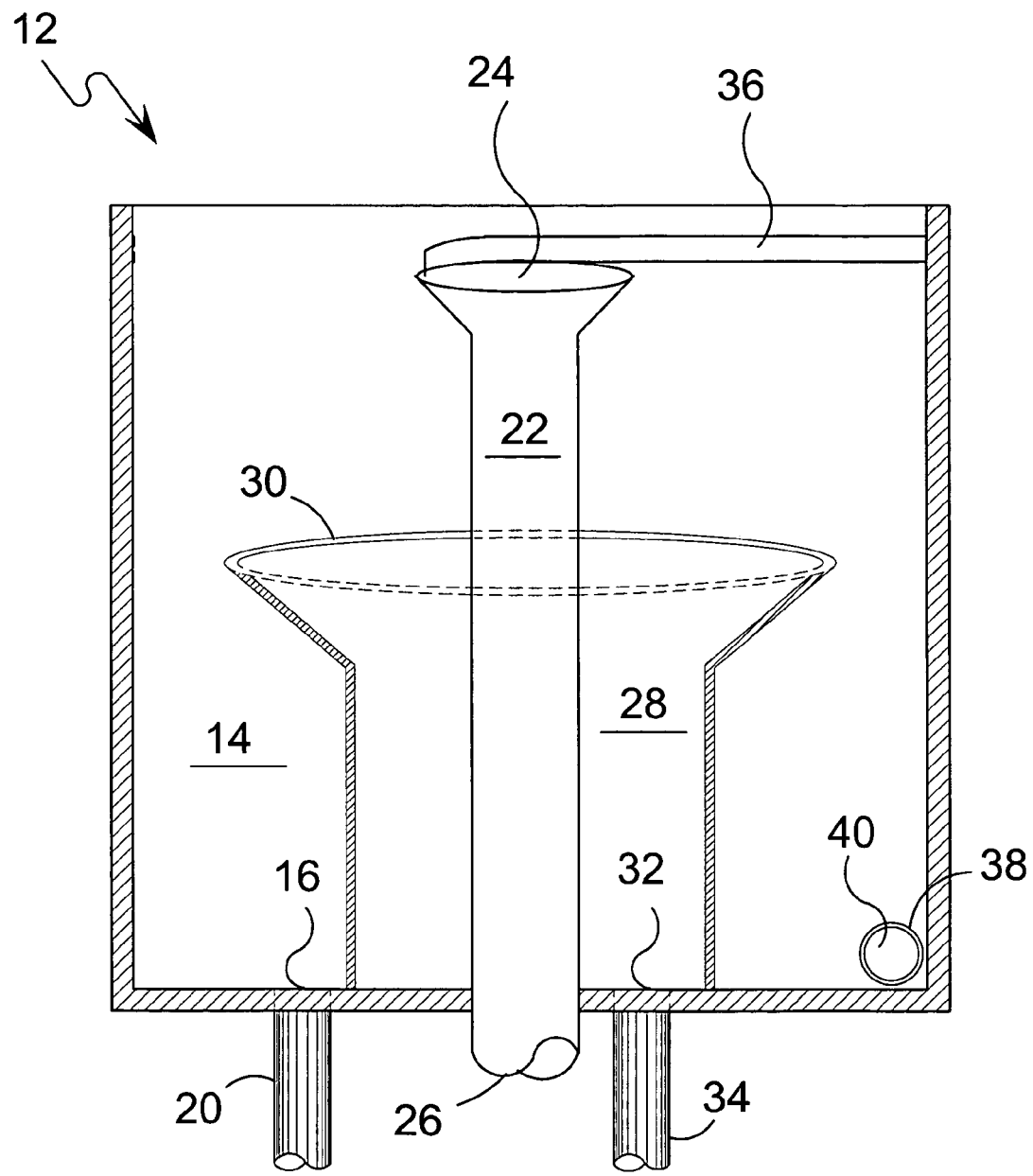
FIG. 5 is a right side planar view of the floatation cell of the open de-inking module for recycled paper.

Referring to FIG. 5, shown is a right side planar view of the floatation cell of the open de-inking module for recycled paper. Shown is a right side view of the open flotation cell 12 of the de-inking module for recycled paper 10 having a centrally disposed foam reject line 26 with the skimmer plate 36 extending to the exterior wall. Also shown is the tangently positioned and angularly displaced injection feed line 38 creating a rotational current and the decontaminated slurry accept line 34 positioned approximate the flotation cell base. The present invention provides for variations of the placement of the feed and accept conduits and various shapes for the passive skimmer plate.

Figure 6:
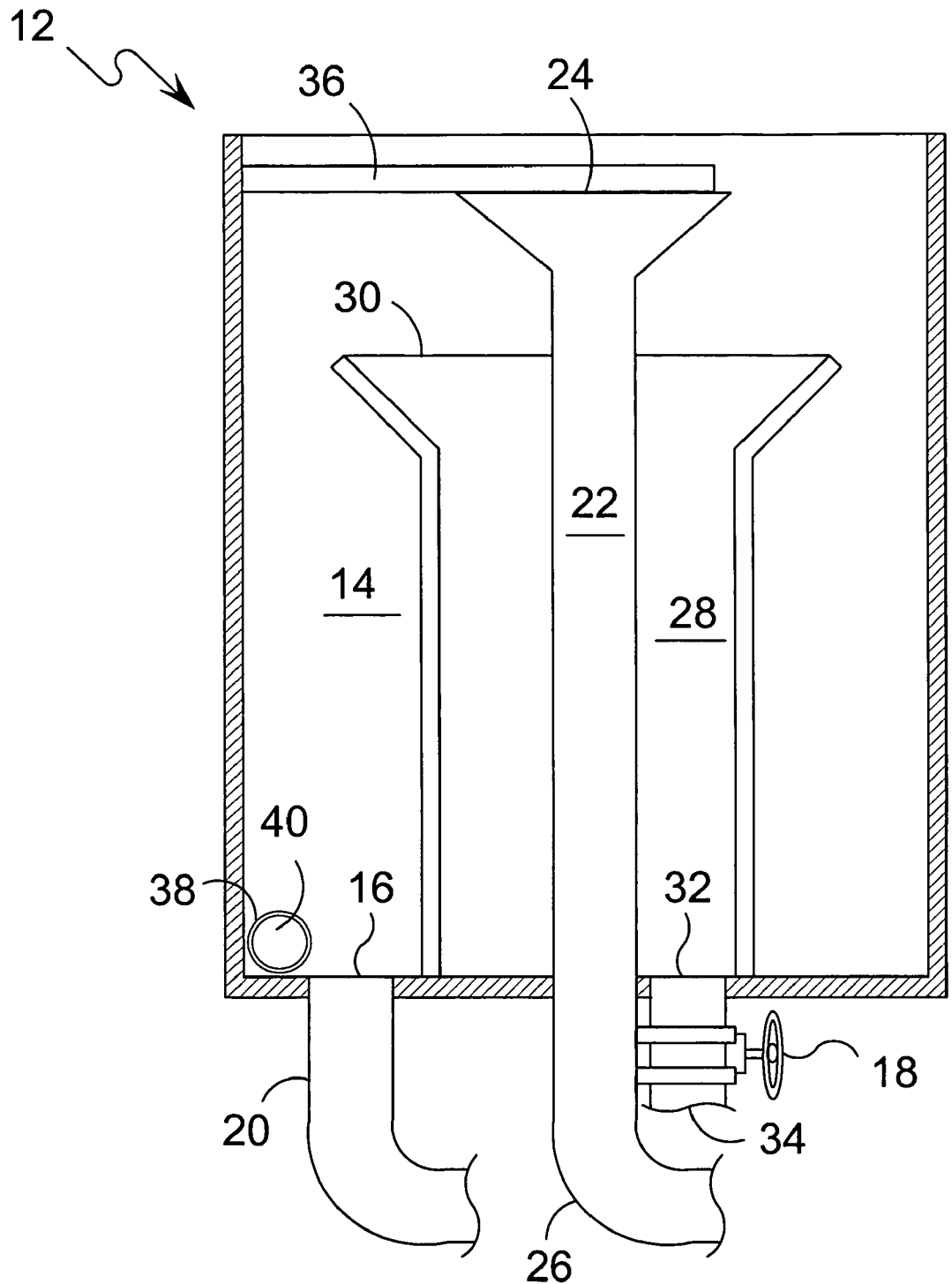
FIG. 6 is a sectional view of an alternate flotation cell of the open flotation de-inking module for recycled paper.

Referring to FIG. 6, illustrated is a sectional view of an alternate flotation cell of the open flotation de-inking module for recycled paper. The flotation cell 12 forms means for the air infused slurry to effervesce forming a foam having the contaminants therein, which are passively skimmed into an effluent line. As illustrated the flotation cell 12 is a cylindrical receptacle having a centrally disposed cylindrical reject compartment 22 with a flared opening 24 and egress line 26. Tangently extending from the flared reject opening 24 to the receptacle exterior wall 12 is a planar skimmer plate 36 diverting the foam into the reject line. The air infused slurry is tangently injected via feed line 38 through port 40 into the flotation cell slurry compartment 14 creating a rotational current with a decontaminated slurry accept compartment 28 having egress port 32 leading into accept line 34 for further processing. Also shown is drain port 16 and drain line 20.

Figure 7:
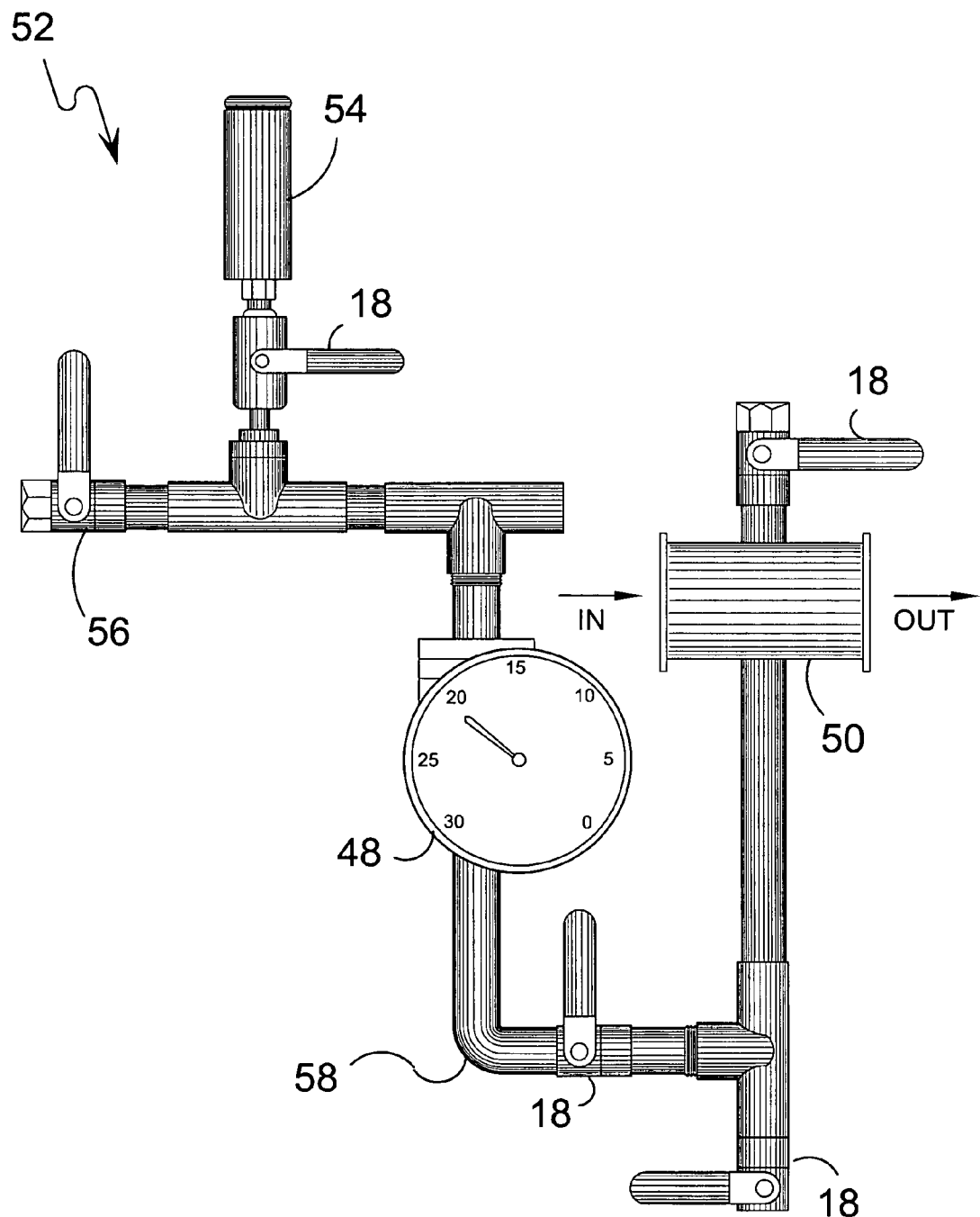
FIG. 7 is a frontal view of the module air flow meter and valve of the open flotation de-inking module for recycled paper.
Figure 8:
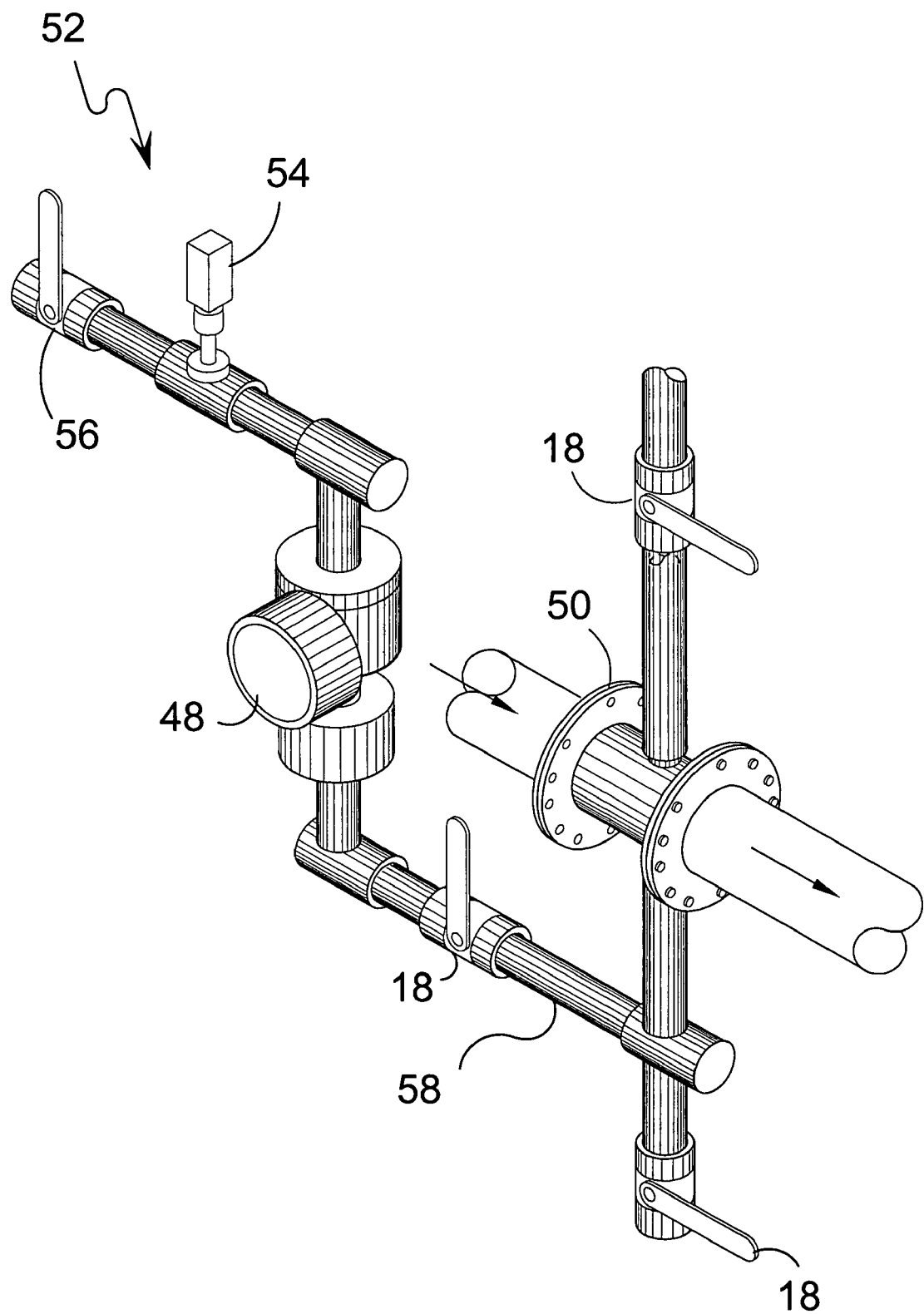
FIG. 8 is a detailed perspective view of the module air flow meter and valve of the open flotation de-inking module for recycled paper.

Referring to FIG. 7, depicted is a frontal view of the module air flow meter and valve of the open flotation de-inking module for recycled paper. The air flow control system 52 incorporates flow meter 54 and air valve 56 used as a safety valve to add extra air into injector 50, from the atmosphere in case of loss of air. Flow meters are used to measure the flow of air drawn by the injectors. Also shown are various valves 18, vacuum gauge 48, and air supply line 58. Referring to FIG. 8, rendered is a detailed perspective view of the module air flow meter and valve 52 of the open flotation de-inking module for recycled paper 10. Shown is the air flow control system comprising a safety valve 56 used to add extra air from the atmosphere in case of loss of air. Flow meters 54 are used to measure the flow of air drawn by the injectors 50. An exhaust line off the moisture trap connected to the flow meter recycles the air preventing the humidity build up in the plant.

Figure 9:
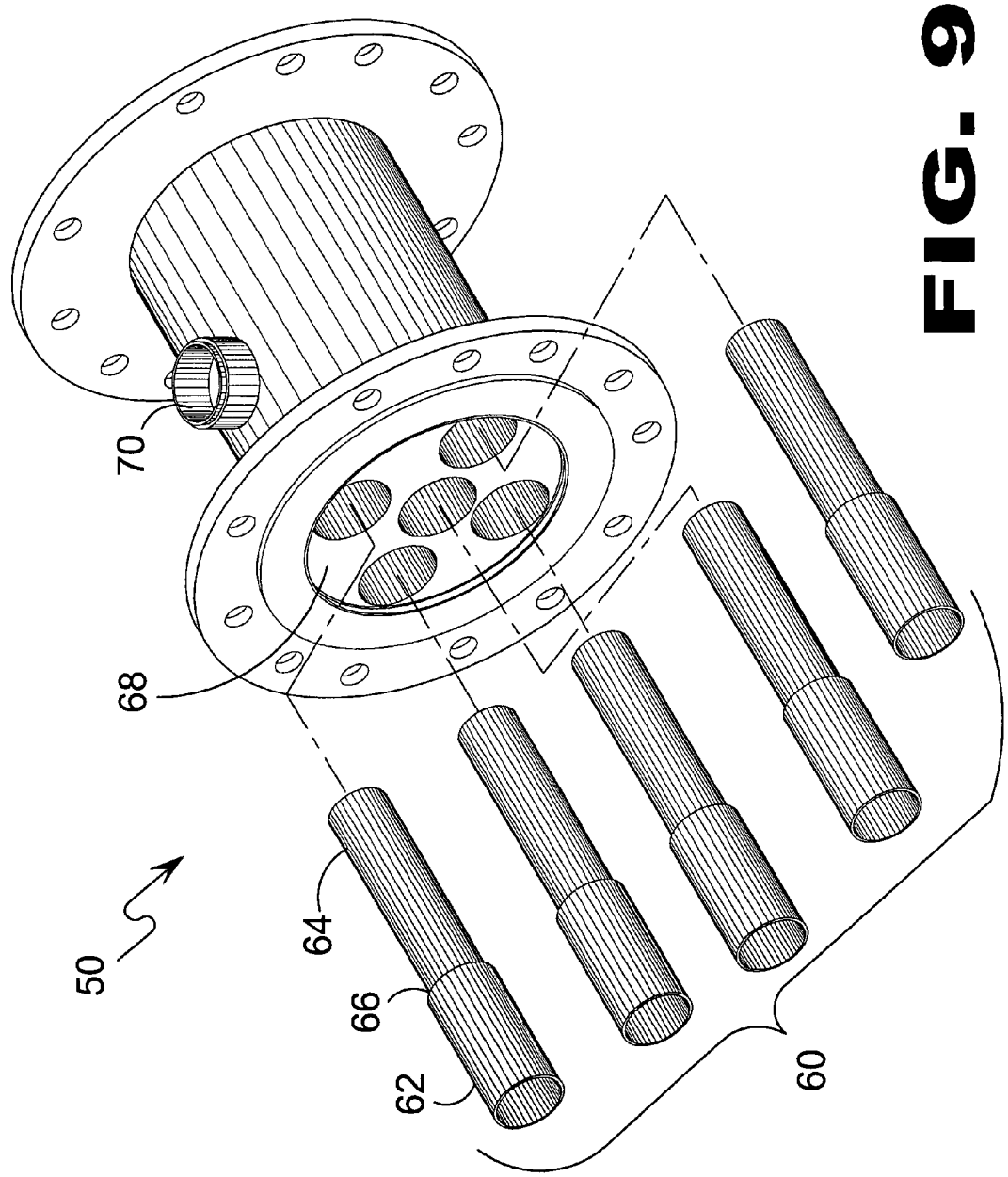
FIG. 9 is an exploded view of the injectors from the injector assembly.

Referring to FIG. 9, drawn is an exploded view of the injectors from the injector assembly. The injector 50 forms means for gasifying a slurry by expanding the infeed bore 62 within the injector assembly 60 having an nozzle air intake 66 as a source of ambient air in communication therewith whereby the negative pressure created draws air into the slurry prior to injection through egress nozzle 64 into a slurry feed line into the flotation cell 12 whereupon the contaminants within the slurry combine with the air bubbles forming a foam at the surface inside of the cell 12 that is passively directed into a reject compartment 22 leaving a decontaminated slurry, known as the accept, which is channeled therefrom through the accept line 34 for further processing.

What is claimed is new and desired to be protected by Letters Patent is set forth in the appended claims:

1. A flotation de-inking module for recycled paper comprising:
   a) an open flotation cell having:
      i) a slurry compartment;
      ii) an accept compartment;
      iii) a reject compartment, said flotation cell having an open top, and all of said slurry, accept, and reject compartments being open at the top, the open top of said reject compartment being an input aperture for said reject compartment, and whereas all entry and exit ports in said flotation cell are at or adjacent a bottom of said cell;

b) an injector assembly to saturate incoming pulp slurry with micro air bubbles and accelerate the air saturated pulp slurry into the slurry compartment through a flotation cell feed line; and c) an air-flow control system for supplying air to said injector assembly.

2. The de-inking module as recited in claim 1, wherein said reject compartment is cylindrically shaped and centrally disposed within said flotation cell.

3. The de-inking module as recited in claim 2, wherein said accept compartment is cylindrically shaped and encompasses said reject compartment.

4. The de-inking module as recited in claim 3, wherein said slurry feed line is tangently positioned relative to said flotation cell thereby causing a rotational flow within the slurry compartment which surrounds said accept compartment.

5. The de-inking module as recited in claim 4, further comprising a skimmer plate extending between the reject compartment input aperture and a flotation cell wall to directed contaminant containing foam into the reject compartment.

6. The de-inking module as recited in claim 5, further comprising a valve in communication with said accept compartment for selectively porting accept pulp slurry for further processing.

7. The de-inking module as recited in claim 1, further comprising a valve in communication with said slurry compartment for selectively draining the slurry compartment into the reject line.

8. The de-inking module as recited in claim 1, wherein said injector assembly includes at least one nozzle for accelerating the pulp slurry prior to injection into the flotation cell.

9. The de-inking module as recited in claim 8, wherein said injector assembly passively draws air from the air control module to infuse micro air bubbles into the pulp slurry to optimize the process of separating ink, clay, stickies and other float able contaminants from recycled pulp slurry.

10. The de-inking module as recited in claim 1, wherein said air control module includes a safety valve to add extra air from the atmosphere in case of loss of air.

* * * * *